United States Patent Office 2,828,344
Patented Mar. 25, 1958

2,828,344

PREPARATION OF STRAIGHT CHAIN OXYGENATED COMPOUNDS

Vincent L. Hughes, Clark Township, Union County, Isidor Kirshenbaum, Union, and Fred W. Banes, Westfield, N. J., assignors to Esso Research and Engineering Company, a corporation of Delaware No Drawing. Application April 4, 1956
Serial No. 575,943

7 Claims. (Cl. 260—604)

This invention relates to an improved process of preparing high yields of straight chain primary oxygenated products from certain olefins by reacting these olefins with carbon monoxide and hydrogen under a specific combination of reaction conditions. More particularly this invention relates to an improved carbonylation process for the production of high yields of straight chain primary aldehydes and alcohols which comprises carrying out a carbonylation process at specified critical temperatures, total gas pressures, catalyst concentrations and with straight chain alpha olefins.

Since the advent of the carbonylation or so-called oxo synthesis many advancements and refinements concerning this process have been made. Essentially however the oxo process is still considered to be inefficient for the preparation of high yields of straight chain primary alcohols.

In the so-called oxo process oxygenated organic compounds are synthesized from many different types of organic compounds containing olefinic carbon linkages by the reaction of carbon monoxide and hydrogen with said compounds in the presence of a catalyst under suitable reaction conditions including elevated temperatures and pressures.

This so-called oxo process is generally carried out in three stages, the first or oxo stage embodying a reaction of the desired olefinic compound with hydrogen and carbon monoxide in the presence of a catalyst such as cobalt oleate or various other cobalt compounds under elevated temperatures and pressures. Conditions employed in this initial reaction zone will depend to a large extent upon the molecular weight olefin employed as well as the catalyst. The effluent from the initial reaction zone will be primarily an aldehydic product, the compounds containing one more carbon atom than the olefins within the feed. In many instances, especially when low molecular weight olefins are employed, an inert diluent is used in this initial stage.

The oxonated or aldehydic product containing dissolved therein salts, carbonyls and various other compounds of the metal catalyst is then generally passed to a zone to purify the product by removing the metal. This is accomplished by various known means including thermal treatment, acid wash, etc. The metal-free aldehyde product is then hydrogenated to produce primary alcohols suitable for many uses and particularly adaptable as intermediates for the preparation of detergents and especially plasticizers.

With respect to the prior art procedures mentioned above, it is known that under conventional operating conditions the aldehyde and eventually alcohol product is a mixture of straight and branched chain compounds resulting from, it is believed, a certain degree of isomerization within the initial reaction zone. The prior art has failed to recognize any substantial difference with respect to product distribution employing a so-called type I alpha olefin (R—C=C) or a type II olefin having an internal double bond (R—C=C—R) as the feed. See for example U. S. 2,625,527, col. 2, lines 38–59. R above represents a normal alkyl radical. Thus under normal operating conditions employing either a type I or II olefin or both, the alcohol product will contain approximately 45–55% of the straight chain alcohol and the remainder branched chain alcohol.

It is known that the straight chain alcohols generally are superior in many respects to the branched chain alcohols. For example, the plasticizers prepared from certain normal alcohols demonstrate far superior aging characteristics, low volatility, and outstanding low temperature properties. Recent studies have also demonstrated the superiority of essentially straight chain alcohols for use in anionic and non-ionic detergents.

It is therefore an object of this invention to produce a straight chain primary alcohol in high yields by employing a novel combination of various reaction conditions in a method which is applicable to the so-called oxo procedure.

In accordance with this invention the process variables which must fall within specified limits are the (1) olefin feed, (2) temperature, (3) total pressure and (4) catalyst concentration.

In accordance with this invention to obtain the production of straight chain alcohols in high yields it is essential that a straight chain type I olefin, i. e. $R\text{—}CH\text{=}CH_2$, be employed as the feed to the oxo reactor. Olefins having from 3 to 20 carbon atoms may be employed and examples thereof are n-butene-1, n-pentene-1, n-hexene-1, n-heptene-1, n-octene-1 and so on up to n-eicosene-1. While it may be desirable to employ a feed comprising 100% type I olefin, in most instances this will not be economically feasible or at least it will be impractical. It is to be understood therefore that the feed may comprise minor amounts of non-type I olefin. While the straight chain alcohol product yield will decrease somewhat in proportion to the amount of non-type I olefin employed, a substantial loss of straight chain alcohol may be avoided by maintaining a major amount of type I olefin in the feed. Accordingly, olefin feeds amenable to the present process may be obtained from such sources as ethylene polymerization, wax cracking, certain hydrocarbon synthesis olefin streams, steam cracked olefins as well as other cracked stocks, etc. It is to be understood that mixtures of straight chain type I olefins may be employed if a mixture of straight chain alcohols is desired. Diluents such as hydrocarbons alcohols, aldehydes, and those normally employed in the so-called oxo process also may be employed herein if desired.

As previously noted the utilization of type I olefins in a process not employing the specific combination of process variables, which will be given in greater detail hereinafter, does not effect the desired results.

Operable temperature conditions for the initial or primary reaction which come within the scope of this invention include from about 60°–100° C., however temperatures within the narrower range of 70°–95° C. are preferred. Temperatures above about 100 C. effect a substantial decrease in the yield of straight chain products and those below about 60° C. effect a decrease in the reaction rate to a point at which the process is economically unattractive. Moreover, in the case of lower feed stocks such as the lower alkene, e. g. butene, a decrease in temperature below about 70°–95° C. will not increase the proportion of straight chain aldehyde in the product.

The present invention contemplates using as a catalyst for this process a group VIII metal compound capable of forming a metal carbonyl under the specific conditions of reaction. Cobalt compounds have in the past been found to be especially effective for this purpose, particularly oil soluble cobalt compounds such as cobalt oleate and salts of other long chain organic acids. Other compounds such as cobalt acetate, cobalt oxide, cobalt formate although not as effective may be employed. For the purpose of the present invention it is desirable to employ a catalyst having a high order of activity. Accordingly it is preferred to use a preformed cobalt carbonyl such as cobalt octacarbonyl or hydrocarbonyl, prepared separately under normal oxonation conditions in an inert diluent. If a catalyst having a lower order of activity than cobalt carbonyl is employed it may be desirable to add a catalyst promoter.

One of the essential factors of the present process is the employment of the catalyst within certain concentrations. It is known that the higher catalyst concentrations generally effect higher rates of reaction and for the present purposes sufficient catalyst must be employed to effect a reasonable reaction rate, one which is suitable for commercial operation. However it has been discovered that beyond certain critical upper limits an increase in catalyst concentration undesirably effects a substantial decrease in the straight chain product yield. Therefore the catalyst in the present process must be employed in concentrations between about 0.1 to 1 wt. percent and preferably 0.3 to 0.7 wt. percent calculated as metal based on olefin feed.

The total $CO+H_2$ pressure has also been found to be an extremely important factor regarding the preparation of straight chain products. Those pressures which fall within the scope of the present invention are from about 2,000 to 10,000 p. s. i. and preferably 3,000 to 6,000 p. s. i. Pressures below about 2,000 p. s. i. effect a decreased yield in straight chain product as well as an undesirable increase in the bottoms yield.

As previously pointed out the use of high proportions of catalyst has undesirable effects upon the product distribution. However, since the oxonation rate at temperatures below about 100° C. is rather slow, it will be desirable to employ means for increasing this rate without altering temperature, catalyst concentration and pressures. It is therefore contemplated, especially when oxonating higher molecular weight olefins, to employ conditions which will promote the reaction without adversely effecting product distribution. It has been found, for example, that an increase of the hydrogen to carbon monoxide ratio over those conventionally used will effect an increase in reaction rate without increasing the amount of branched product. This is surprising because other means of increasing reaction rate such as increasing catalyst concentration, temperature, the addition of certain promoters result in poor yields of straight chain product. The $H_2/CO$ ratio may be from 2/1 to 6/1, preferably 3/1 to 4/1, the particular selection depending upon the desired reaction rate, and olefin feed.

The following tables showing the results of various experiments illustrate the necessity of employing all of the aforementioned conditions within the prescribed limits.

Table I shows the results of an oxo process wherein all conditions fall within the scope of this invention with the exception of the olefin feed.

Table II shows the results of an oxo process wherein the effect of temperature is shown.

Table III shows the effect of pressure on the product distribution.

Table IV shows the effect of increased catalyst concentration on the product distribution.

TABLE I

*Effect of olefin type on product*

| Run | 1 | 2 |
|---|---|---|
| Catalyst | Cobalt Carbonyl.[1] | Cobalt Carbonyl.[1] |
| Wt. Percent | 0.5 [2] | 0.5.[2] |
| $H_2/CO$ | 3 to 1 | 3 to 1. |
| Total Pressure | 3,500 p. s. i. | 3,500 p. s. i. |
| Temperature | 85° C | 85° C. |
| Conversion, Mole Percent | 97 | 95. |
| Feed | n-Heptene-1 | n-Heptene-2. |
| Percent Straight Chain in Alcohol Product. | 75 | 49. |

[1] Prepared by reacting cobalt oleate with $CO+H_2$ (1 to 1) at 150° C. and 3,500 p. s. i.
[2] Calculated as cobalt metal on olefin feed.

TABLE II

*Effect of temperature on product*

| Run | 3 | 4 | 5 | 6 | 7 | 8 |
|---|---|---|---|---|---|---|
| Diluent | Hexane | Hexane | Hexane | None | None | None. |
| Catalyst | Preformed Co Carbonyl. | Preformed Co Carbonyl. | Preformed Co Carbonyl. | Preformed Co Carbonyl. | Preformed Co Carbonyl. | Preformed Co Carbonyl. |
| Wt. Percent | 0.5 | 0.5 | 0.5 | 0.5 | 0.5 | 0.05. |
| $H_2/CO$ | 3.4 to 1 | 3.4 to 1 | 3.4 to 1 | 3.4 to 1 | 3.4 to 1 | 1 to 1. |
| Total Pressure, p. s. i. | 3,500 | 3,500 | 3,500 | 3,500 | 3,500 | 3,500. |
| Olefin Feed | n-butene-1 | n-butene-1 | n-butene-1 | n-heptene-1 | n-heptene-1 | n-heptene-1. |
| Temperature, ° C. | 70 | 90 | 150 | 70 | 85 | 175. |
| Percent Straight Chain in Alcohol Product | 73 | 75 | 54 | 80 | 75 | 43. |

TABLE III

*Effect of pressure on product*

| Run | 9 | 10 | 11 | 12 |
|---|---|---|---|---|
| Olefin | n-Heptene-1 | n-Heptene-1 | n-Heptene-1 | n-Heptene-1. |
| Catalyst | Preformed Co Carbonyl. | Preformed Co Carbonyl. | Preformed Co Carbonyl. | Preformed Co Carbonyl. |
| Wt. Percent | 0.5 | 0.5 | 0.5 | 0.5. |
| Total Pressure, p. s. i. | 600 | 3,500 | 3,500 | 5,000. |
| $H_2/CO$ | 3 to 1 | 3 to 1 | 3 to 1 | 3 to 1. |
| Temperature, ° C. | 95 | 95 | 85 | 85. |
| Percent Straight Chain in Alcohol Product. | 45 | 73 | 75 | 75. |
| Percent Bottoms | 43 | 25 | 25 | 25. |

TABLE IV
Effect of catalyst concentration on product

| Run | 13 | 14 | 15 | 16 |
|---|---|---|---|---|
| Olefin | n-Heptene-1 | n-Heptene-1 | n-Heptene-1 | n-Heptene-1. |
| Total Pressure, p. s. i. | 3,500 | 3,500 | 3,500 | 3,500. |
| $H_2/CO$ | 3 to 1 | 3 to 1 | 1 to 1 | 1 to 1. |
| Temperature, °C | 70 | 70 | 85 | 85. |
| Catalyst | Preformed Co Carbonyl. | Preformed Co Carbonyl. | Preformed Co Carbonyl. | Preformed Co Carbonyl. |
| Wt. Percent on Feed | 0.5 | 2.0 | 0.5 | 2.0. |
| Percent Straight Chain in Alcohol Product. | 80 | 68 | 75 | 48. |

Analyzing the data in the tables above it is readily seen that a combination of the conditions recited above are necessary to the preparation of straight chain products in high yields. If any one of the conditions, i. e., olefin type, temperature, pressure or catalyst deviates from the limitations expressed herein, a substantial loss of straight chain product is realized.

It will be noted that a decrease in total pressure below those specified herein also results in an undesirable increase in the bottoms or higher boiling material.

It is to be understood that the aldehydic product may be hydrogenated under conventional conditions such as those which follow:

Temperature, °C _____ 140–320.
Pressure ($H_2$), p. s. i. g. 2000–5000.
Catalyst _____ Supported or unsupported, nickel, copper chromite, oxides and sulfides of tungsten, molydenum and the like.

The following examples illustrate operative embodiments of the invention:

EXAMPLE 1

A three liter stainless steel super-pressure vessel was charged with the following reactant: 500 ccs. of heptene-1 containing <5% of heptene-2, and 100 ccs. of hexane containing 1.75 grams of cobalt as the carbonyl per hundred ccs. of solution. The vessel was closed and 3100 p. s. i. g. of a 3:1 mixture of $H_2$:CO were pressured into the vessel. The vessel was then heated to 70° C. and shaken to insure mixing. When reaction started, as shown by gas absorption, the pressure dropped smoothly for 4 hours. When no further gas absorption occurred, the vessel was cooled, vented and opened. A nickel on kieselguhr catalyst was added and the vessel closed. 2000 p. s. i. g. of hydrogen were added and the vessel heated to 180° C. As hydrogen was absorbed, the vessel was repressured, until no further uptake of gas was noticeable. The vessel was cooled, vented and the product removed. The alcohol was distilled at 175 mm. Hg in an Oldershaw column. The first cut contained catalyst solvent, n-hexane and a small amount of heptane. The next cut (octyl alcohol) boiled from 142°–153° C. and comprised 76 mole percent of the olefin fed to the oxo stage. The alcohol was found to contain 79.5% straight chain isomer.

EXAMPLE 2

500 ccs. of butene-1 were added to a high pressure reactor and 0.5% cobalt, as the carbonyl, was added. This reaction mixture was oxonated at 90° C. with a 1/1 mixture of hydrogen and carbon monoxide until reaction was essentially complete. Then it was hydrogenated in the conventional manner over a supported nickel catalyst. The product was distilled at atmospheric pressure to give an 80% yield of alcohol boiling between 128° and 135.5° C. Analysis showed that 75% of the alcohol was the straight chain isomer. A similar oxonation at 175° C. gave a product containing only 43% of the straight chain isomer.

The prior art literature is rich with disclosures concerning various types of hydrogenation, decobalting and other operations associated with the oxo process and it is to be understood that the present process may be employed in conjunction with various known subsequent treatments of the aldehyde product. Accordingly this invention will find its greatest utility in continuous oxo operations of the type which are in commercial use.

What is claimed is:

1. A process of preparing high yields of straight chain oxygenated products which comprises reacting a straight chain alpha olefin having from 3 to 20 carbon atoms in the molecule with carbon monoxide and hydrogen in the presence of 0.1 to 1 wt. percent of a cobalt containing catalyst based on the olefin feed at a temperature within the range of 60° to 100° C., a hydrogen to carbon monoxide ratio of from 2–6 to 1 and a total pressure of at least 2,000 p. s. i. and recovering an aldehyde product having one more carbon atom than said olefin, said aldehyde product containing a major portion of straight chain compounds.

2. A process in accordance with claim 1 wherein the cobalt containing catalyst comprises a cobalt carbonyl.

3. A process in accordance with claim 1 wherein said olefin is heptene-1.

4. A process in accordance with claim 1 wherein said olefin is butene-1.

5. A process in accordance with claim 4 wherein an inert diluent for the olefin is added.

6. In a carbonylation process wherein an olefin is reacted with carbon monoxide and hydrogen at elevated temperatures and pressures in the presence of a cobalt containing catalyst in a carbonylation zone to form an aldehyde product containing one more carbon atom than the starting olefin and wherein said aldehyde product is hydrogenated at elevated temperatures and pressures in the presence of a hydrogenation catalyst to form an alcohol product, the improvement which comprises employing as said olefin a straight chain alpha olefin having 3 to 20 carbon atoms in the molecule, maintaining the cobalt containing catalyst in a ratio of 0.1:1 wt. percent based on olefin feed, a temperature in said carbonylation zone within the range of 60° to 100° C., a hydrogen to carbon monoxide ratio of from 2–6:1 and a total pressure of at least 2000 p. s. i., whereby said alcohol product comprises at least a major portion of normal primary alcohol.

7. A process in accordance with claim 6 wherein said cobalt containing catalyst comprises a cobalt carbonyl.

References Cited in the file of this patent
UNITED STATES PATENTS 2,437,660 Gresham et al. _____ Mar. 9, 1948

FOREIGN PATENTS 708,441 Great Britain _____ May 5, 1954

OTHER REFERENCES

Adkins et al.: J. Am. Chem. Soc. 20, 383–6 (1948).